United States Patent [19]

Drefahl

[11] Patent Number: 5,005,863

[45] Date of Patent: Apr. 9, 1991

[54] INSTALLABLE COMPONENT FOR ABSORBING ENERGY

[75] Inventor: Klaus Drefahl, Hanau am Main, Fed. Rep. of Germany

[73] Assignee: Kolbenschmidt Aktiengesellschaft, Neckarsulm, Fed. Rep. of Germany

[21] Appl. No.: 436,275

[22] Filed: Nov. 13, 1989

[30] Foreign Application Priority Data

Nov. 15, 1988 [DE] Fed. Rep. of Germany ....... 3838594

[51] Int. Cl.$^5$ .............................................. B62D 1/18
[52] U.S. Cl. .................................... 280/777; 74/492; 138/172; 296/189
[58] Field of Search ................ 280/777, 784; 296/189; 188/371, 377; 138/172; 74/492

[56]  References Cited

U.S. PATENT DOCUMENTS

| 3,373,629 | 3/1968 | Wight et al. | 280/777 |
| 3,482,466 | 12/1969 | Orlich et al. | 280/777 |
| 3,495,474 | 2/1970 | Nishimura et al. | 280/777 |
| 3,508,633 | 4/1970 | Nishimura et al. | 280/777 |
| 3,523,587 | 8/1970 | Mazelsky | 280/777 |
| 3,540,304 | 11/1970 | Weiss | 280/777 |
| 3,774,713 | 11/1973 | Stegmaier | 180/90 |
| 3,774,932 | 11/1973 | Schiesteri | 280/777 |
| 3,797,601 | 3/1974 | Barenyi et al. | 180/90 |
| 4,465,301 | 8/1984 | Bongers et al. | 280/777 |
| 4,577,736 | 3/1987 | Bongers et al. | 280/777 |
| 4,601,367 | 7/1986 | Bongers | 280/777 |

FOREIGN PATENT DOCUMENTS 1912528 1/1975 Fed. Rep. of Germany .
2614041 10/1977 Fed. Rep. of Germany .

Primary Examiner—Richard A. Bertsch
Attorney, Agent, or Firm—Sprung, Horn, Kramer & Woods

[57]  ABSTRACT

An installable component which serves to absorb energy and is intended to be used with steering wheels of motor vehicles having a steering wheel hub which is recessed from the rim of the steering wheel consists of a plurality of deformable metal rods, which have parallel axes and are arranged in a circle and at each end are firmly interconnected by a metal flange. In order to improve the energy absorption performance the metal rods are adapted to buckle in the direction of the larger principal moment of inertia under an axially acting pressure force, and at least one of the broadsides, which extend at right angles to the axis of the larger principal moment of inertia and include a right angle with the radius of the installable component, is provided with spur teeth, which extend transversely to the longitudinal direction.

15 Claims, 5 Drawing Sheets

INSTALLABLE COMPONENT FOR ABSORBING ENERGY

This invention relates to an installable component for absorbing energy, comprising a plurality of inelastically deformable, straight metal rods, which have parallel axes and are arranged on a circle and are firmly interconnected at each end by a metal flange, particularly for use with steering wheels of motor vehicles, which steering wheels have a steering wheel hub which is recessed relative to the rim of the steering wheel which is firmly connected to the installable component, which on the side facing the driver is covered by an impact plate of deformable plastic.

Components which have been installed in steering systems of motor vehicles and serve to absorb energy by an upsetting deformation of a mechanical structure are required in case of a collision to take up as strain energy the kinetic energy of the driver as if he is thrown against the steering wheel. The kinetic energy of the driver is to be taken up by displacements which are as large as possible so that the forces involved will be "small" and heavy injury to the driver will thus be prevented.

For instance, DE-B-1 912 528 describes a steering wheel for motor vehicles in which that component which provides an impact surface cooperates in case of an accident with an installed tubular component for absorbing energy. The installed component has a gridlike structure, which is constituted by pairs of strips, which extend from a common point and form helical convolutions having the same lead and opposite hands. The crossings of the pairs of strips are regularly spaced around the periphery. In such an installable component a substantial part of the capacity to deform will be eliminated by the pairs of strips and will be dissipated by their crossings because under a compressive load they will bear on each other in a stack so that the extent of the deformation will be reduced. The same disadvantage is involved in the tubular installable component which has been described in DE-A-2 623 521 and serves to absorb energy and is formed with numerous apertures, which are systematically arranged. In that component the wall portions which are effective for a deformation are desired to have approximately the same magnitude.

DE-A-2 614 041 discloses an installable component which serves to absorb energy and consists of an elastically or plastically deformable metal member, which is constituted by supporting elements, such as webs, struts, rods or the like, which are juxtaposed on a circle and are provided with outwardly facing rated buckling portions and designed to buckle outwardly in response to a compressive load applied to the steering wheel. Such an installable component has the disadvantage that adequate energy cannot be dissipated by the deformation whereas the compressive force may rise to dangerously high peaks. The same disadvantage is involved in all installable tubular components for absorbing energy which have been described hereinbefore.

For this reason it is an object of the invention to design the installable component which has been described first hereinbefore and serves to absorb energy that in case of a collision the deforming force will initially increase relatively rapidly and will then remain almost constant over a major part of the extent of the deformation. As a result, the compressive force-displacement characteristic will have a trapezoidal configuration under the curve so that the installable component will exhibit an ideal energy absorption performance.

That object is accomplished in that the transverse dimensions of each prismatic metal for are small relative to its longitudinal dimensions, the metal rods are adapted to buckle in the direction of the larger principal moment of inertia under an axially acting pressure force, and at least one of the broadsides, which extend at right angles to the axis of the larger principle moment of inertia and include a right angle with the radius of the installable component, is provided with spur teeth, which extend transversely to the longitudinal direction.

With that design, the installable component will exhibit an ideal energy absorption performance under static and dynamic compressive loads because the curve by which the deforming force is plotted against the extent of the deformation will have an approximately trapezoidal configuration in case of compressive loads of both kinds.

In response to a sudden shocklike compressive load acting in an axial direction the several metal rods of the installable component will buckle to form small sinusoidal bends adjacent to their free effective length and the deforming force will initially rise relatively steeply and will remain constant over the major part of the extent of the deformation because the spur teeth will bear on each other adjacent to the bend progressively from the peak of the bend.

Each metal rod will buckle in the direction of its larger principle moment of inertia. The buckling direction can be predetermined in that, in accordance with a special feature of the invention, the spur teeth are provided on that broadside of the metal rod which faces oppositely to the desired buckling direction, preferably adjacent to the free effective length of that broadside.

An optimum energy absorption performance can be achieved if the spur teeth are provided on the metal rods adjacent to the free effective length on that broadside which faces oppositely to the predetermined buckling direction and are provided in the regions between the fixing portions of the metal rods at the flanges and the points of inflection of the bend on that broadside which faces in the desired buckling direction.

As a rule, the straight teeth of the metal rods extend over the broadside thereof.

The deforming force acting on the metal rods may be increased in that the spur teeth extend from the narrow sides of the metal rod, which are parallel to the plane which includes the axes of the smaller and the larger principal moments of inertia, and each of said spur teeth extends over less than 50%, preferably over 20 to 40%, of the width of the broadside.

In a preferred embodiment of the invention, spur teeth are constituted by a comblike array of bent up tines, which are integrally joined to one or both of the narrow sides of the metal rod and include an angle of 90° with the broadside.

In a modification of that embodiment, the spur teeth may be formed in that the tines of the comblike array are bent up to include a right angle with the broadside of the metal rod.

In accordance with a further feature of the metal rod the spur teeth have the shape of an involute, cycloid or arc of a circle or are U-shaped and have right-angled or inclined side faces.

The installable component which serves to absorb energy and is designed in accordance with the invention is shown by way of example on the drawings and will be described in more detail hereinafter.

Figure 5:
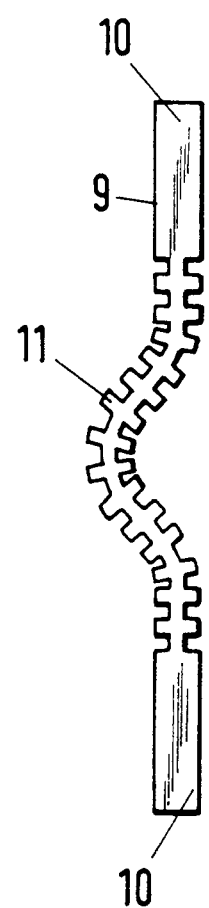
Figure 6:
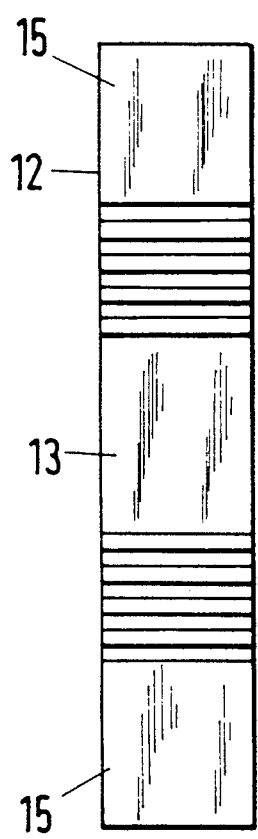
Figure 7:
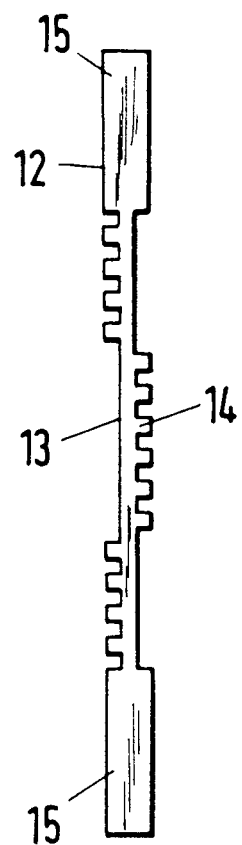
Figure 8:
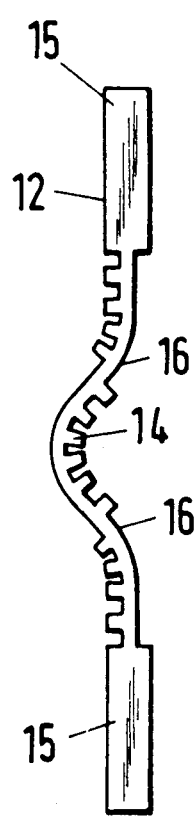
Figure 9:
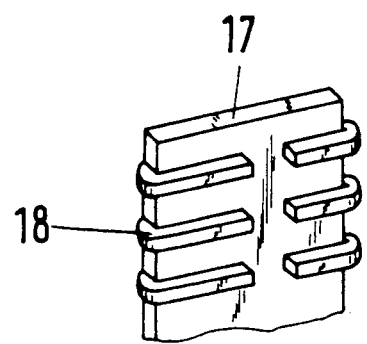
Figure 10:
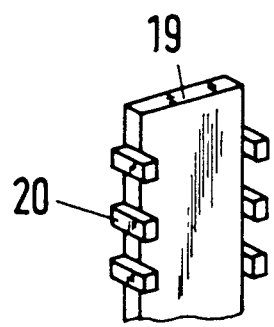
Figure 11:
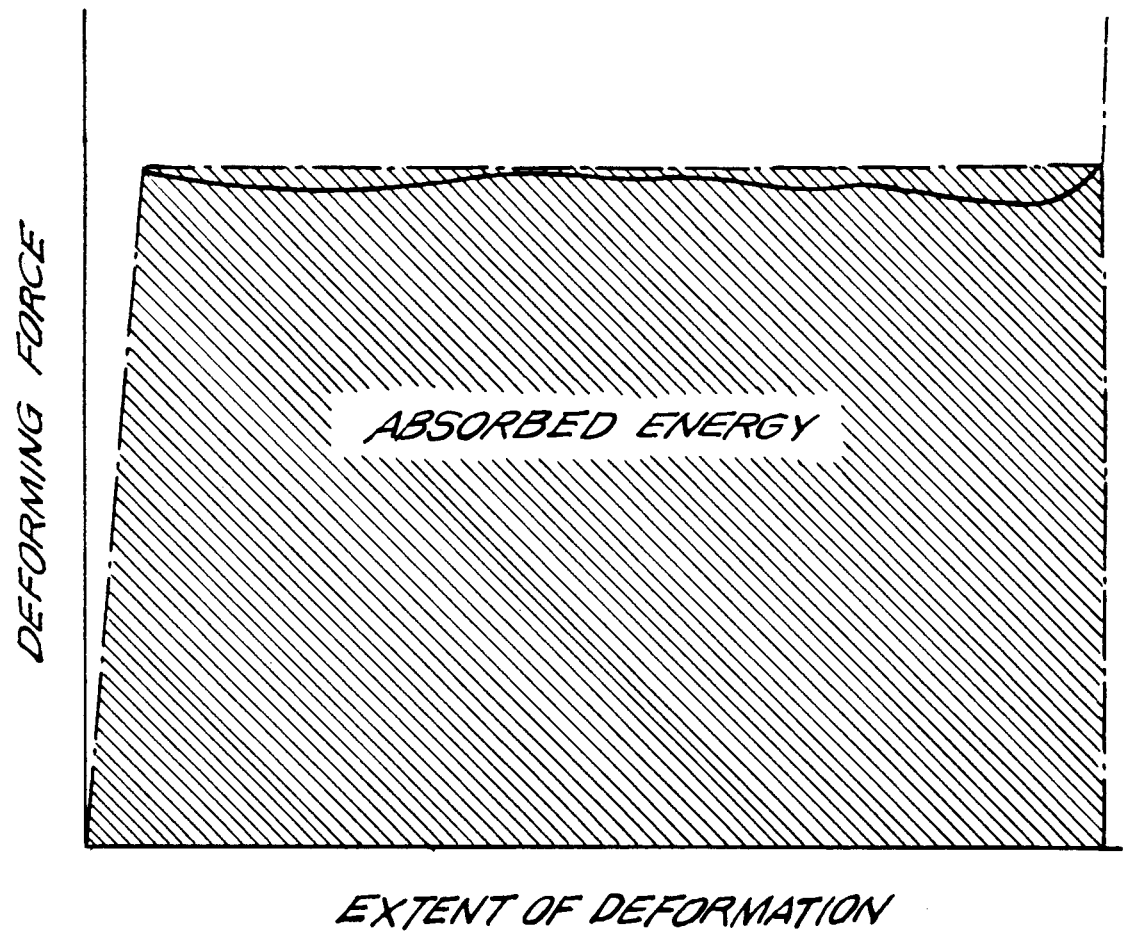

FIG. 5. shows the metal rod which has buckled under a compressive load;

FIG. 6 is a side elevation view in the direction of the axis of the larger principal moment of inertia of a metal rod;

FIG. 7 is a side elevation viewed at right angles to the axis of the larger principal moment of inertia;

FIG. 8 shows the metal rod which has buckled under a compressive load;

FIG. 9 is a perspective view of a metal rod in which the spur teeth are constituted by a comblike array of tines;

FIG. 10. is a perspective view showing a portion of a metal of in which the spur teeth are constituted by a comblike tines;

FIG. 11. is a compressive force-displacement graph.

Figure 1:
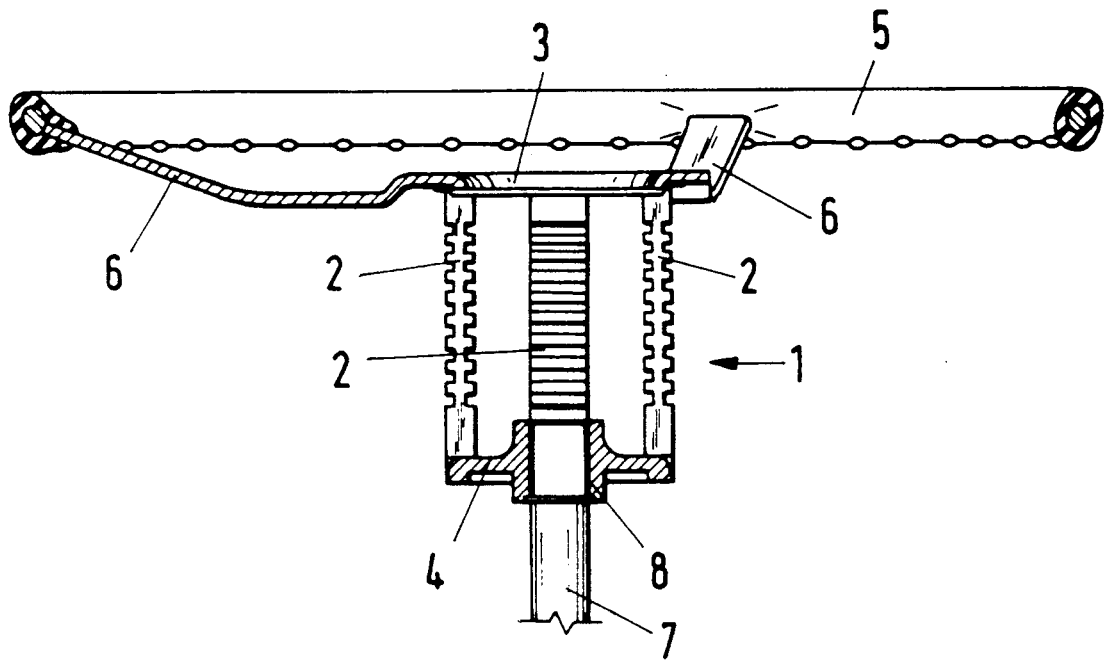
FIG. 1 is a diagrammatic longitudinal sectional view of the steering wheel and energy absorbing component.
Figure 2:
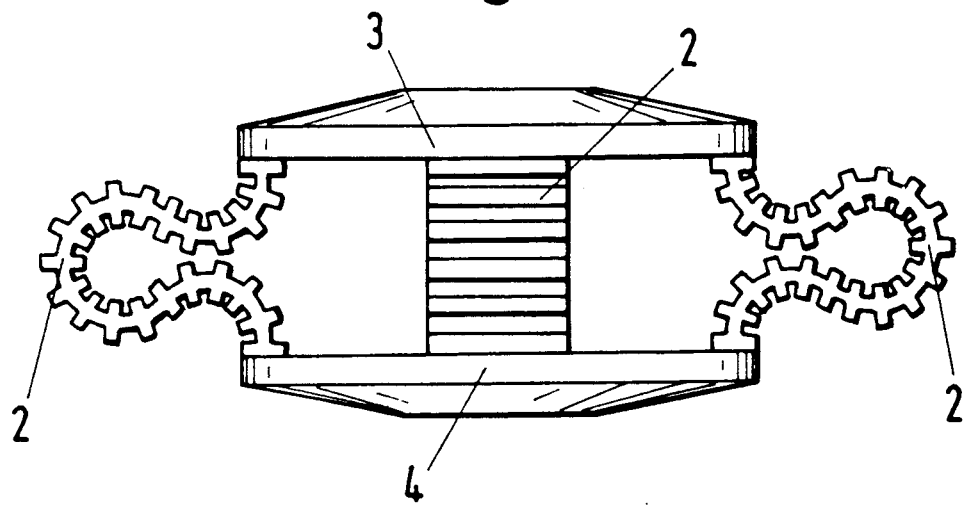
FIG. 2 is a side elevation showing an installable component after a deformation.

FIG. 1 is a diagrammatic longitudinal sectional view on a plane which includes the steering axis and illustrates a steering wheel which is connected to an installed component for absorbing energy. FIG. 2 is a side elevation showing an installable component after a deformation. The installable component 1 consists of a plurality of metal rods 2 made of steel of the type St37. Said metal rods have parallel axes and arranged on a circle and are adapted to be inelastically deformed. At each end, the metal rods are firmly interconnected by a steel flange 3 or 4. The spokes of the steering wheel are connected to the rim 5 of the steering wheel and secured to that flange 3 which faces the driver. The hub 8 of the steering wheel is mounted on the steering column 7 and is secured to that flange 4 which is adjacent to the steering column.

Figure 3:
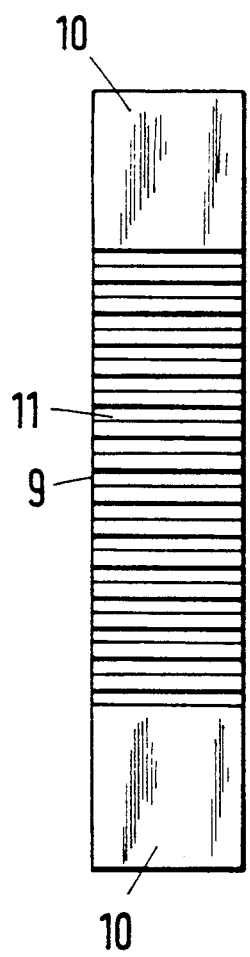
FIG. 3 is a side elevation viewed in the direction of the axis of the larger principal moment of inertia of a metal rod.
Figure 4:
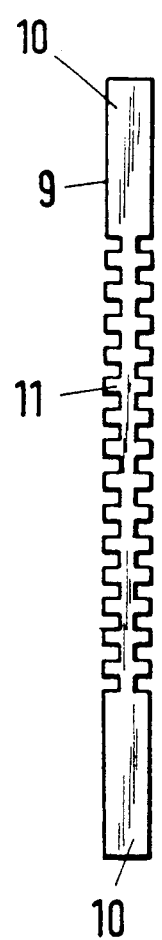
FIG. 4 is a side elevation viewed at right angles to the axis of the larger principal moment of inertia.

A metal rod 9 is shown in FIG. 3 in a side elevation viewed in the direction of the axis of the larger principal moment of inertia and in FIG. 4 in a side elevation viewed at right angles to the axis of the larger principal moment of inertia. In that metal rod 9 the two broadsides extend at right angles to the axis of the larger principal moment of inertia and are provided with rectangular spur teeth 11 between the fixing portions 10, which are to be connected to the flanges. FIG. 5 shows the metal rod 9 which has buckled under a compressive load.

a metal rod 12 is shown in FIG. 6 in a side elevation viewed in the direction of the axis of the larger principal moment of inertia and in FIG. 7 in a side elevation viewed at right angles to the axis of the larger principal moment of inertia,. Adjacent to its free effective length 13 the metal rod 12 is provided with rectangular spur teeth 14 on that broadside which faces oppositely to the buckling direction. On that broadside which faces in the buckling direction, spur teeth 14 are provided in the region between the fixing portions 15 of the metal rod 12, which fixing portions are to be connected to the flanges, and the points of inflection 16 of the bend.

FIG. 9 is a perspective view showing a portion of a metal rod 17 in which the spur teeth are constituted by a comblike array of tines 18, which are provided at the two narrow sides of the rod and have been bent onto one broadside.

FIG. 10 is a perspective view showing a portion of a metal rod 19 in which spur teeth are constituted by a comblike array of tines 20, which are provided at the narrow sides of the rod and have been bent to include an angle of 90° with one broadside.

In the compressive force-displacement graph shown in FIG. 11 the deforming force is plotted against the extent of the deformation. A dash-dot line represents the deformation behavior of an ideal installable component for absorbing energy and the solid curve represents the deformation behavior of such an installable components which is designed in accordance with the invention. It is seen that the energy absorption performance of the installable component 1 which is designed in accordance with the invention deviates only relatively slightly from the ideal configuration of the compressive force-displacement characteristic for an installable component for absorbing energy.

I claim:

1. An installable component for use with steering wheels of motor vehicles, comprising a plurality of inelastically deformable, straight prismatic metal rods (2, 9, 12, 17, 19), which have parallel axes, are arranged on a circle, and are firmly interconnected at each end by a metal flange, the transverse dimensions of each prismatic metal rod being small relative to its longitudinal direction, the prismatic metal rods being adapted to buckle in the direction of the larger principle moment of inertia under an axially acting pressure force, and the prismatic metal rods having broadsides, which extend at right angles to the axis of the larger principle moment of inertia and include a right angle with the radius of the circle formed by the prismatic metal rods, at least one of the broadsides being provided with spur teeth (11, 14, 18, 10), which extend transversely to the longitudinal direction.

2. An installable component according to claim 1, wherein the spur teeth (14, 18, 20) of the metal rods (12, 17, 19) are provided on that broadside which faces oppositely to the desired buckling direction.

3. An installable component according to claim 2, wherein the spur teeth (14) are provided between the fixing portions (15) of the metal rods (12) and the points of inflection (16) of the buckled portion on that broadside of the metal rods (12) which faces in the desired buckling direction.

4. An installable component according to claim 1, wherein the spur teeth (14) are provided on the broadside of the metal rods (12) adjacent to the free effective length (13) thereof.

5. An installable component according to claim 1, wherein the sour teeth (11, 14) of the metal rods (9, 12) extend over the broadsides.

6. A component according to claim 1, wherein the spur teeth are constituted by a comblike array of tines (18), which are integrally joined to the metal rod at least of its narrow sides (17) and have been bent onto the broadside.

7. A component according to claim 1, wherein the spur teeth are constituted by a comblike array of bent up tines (20), which are integrally joined to at least one of the narrow sides of the metal rod (19) and include a right angle with the broadsides.

8. The component according to claim 1, wherein each of said spur teeth extends over 20 to 40% of the width of the broadside.

9. An installable component according to claim 1, wherein the prismatic metal rods (17) have narrow sides, which are parallel to the plane which includes the axes of both principal moments of inertia, the spur teeth (18) extend from the narrow sides of the metal rods, and each of the spur teeth extends over less than 50% of the width of the broadside.

10. An installable component according to claim 1, wherein the spur teeth have the shape of an involute of a circle.

11. An installable component according to claim 1, wherein the spur teeth have the shape of a cycloid of a circle.

12. An installable component according to claim 1, wherein the spur teeth have the shape of an arc of a circle.

13. An installable component according to claim 1, wherein the spur teeth are U-shaped and have right-angled side faces.

14. An installable component according to claim 1, wherein the spur teeth are U-shaped and have inclined side faces.

15. A steering wheel for motor vehicles, which contains the installable component according to claim 1.

* * * * *

UNITED STATES PATENT AND TRADEMARK OFFICE
CERTIFICATE OF CORRECTION

PATENT NO. : 5,005,863

DATED : April 9, 1991

INVENTOR(S) : Drefahl, Klaus

It is certified that error appears in the above-identified patent and that said Letters Patent is hereby corrected as shown below:

Col. 4, line 40   Delete " 10 " and substitute -- 20 --

Col. 4, line 57   Delete " sour " and substitute -- spur --

Col. 4, line 61   Delete " least " and substitute -- at least one --

Signed and Sealed this

Eighteenth Day of May, 1993

MICHAEL K. KIRK

*Attesting Officer*   Acting Commissioner of Patents and Trademarks